United States Patent
Doss et al.

(10) Patent No.: US 7,815,377 B2
(45) Date of Patent: Oct. 19, 2010

(54) DUAL FUNCTION SPLICE COMPONENT FOR MECHANICAL SPLICE CONNECTOR

(75) Inventors: Donald G. Doss, Keller, TX (US); Daniel Leyva, Jr., Arlington, TX (US); Brandon Andrew Barnes, Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/888,191

(22) Filed: Jul. 31, 2007

(65) Prior Publication Data

US 2008/0044144 A1    Feb. 21, 2008

Related U.S. Application Data

(63) Continuation of application No. 11/377,827, filed on Mar. 16, 2006, now Pat. No. 7,264,410.

(51) Int. Cl.
*G02B 6/00* (2006.01)
*G02B 6/255* (2006.01)
*C03B 37/15* (2006.01)

(52) U.S. Cl. .............................. 385/98; 385/95; 385/96; 385/97; 385/99; 385/135; 65/407

(58) Field of Classification Search ............. 385/95–99, 385/135; 65/407
See application file for complete search history.

(56) References Cited

U.S. PATENT DOCUMENTS

| 4,030,809 A | 6/1977 | Onishi et al. ............... 350/96 C |
| 4,257,674 A | 3/1981 | Griffin et al. ............. 350/96.21 |
| 4,741,591 A | 5/1988 | Grabbe et al. ............ 350/96.21 |
| 4,755,018 A | 7/1988 | Heng et al. ............... 350/96.21 |
| 4,877,303 A | 10/1989 | Caldwell et al. .......... 350/96.21 |
| 4,923,274 A | 5/1990 | Dean ........................ 350/96.21 |
| 4,964,688 A | 10/1990 | Caldwell et al. ........... 385/96.2 |
| 5,040,867 A | 8/1991 | deJong et al. ................. 385/60 |
| 5,159,655 A | 10/1992 | Ziebol et al. .................. 385/81 |
| 5,261,020 A | 11/1993 | deJong et al. ................. 385/76 |

(Continued)

FOREIGN PATENT DOCUMENTS

EP    0269409 A2    6/1988

OTHER PUBLICATIONS

Siecor® CAMLITE™ Multimode Connector Procedure for Laser Usage, SRP-006-046, CIRCA 1991, 2 pages.

(Continued)

*Primary Examiner*—Charlie Peng
*Assistant Examiner*—Jerry Blevins

(57) ABSTRACT

A fiber optic mechanical splice connector including a single connector element operable for providing optical fiber alignment and strain relief includes opposed splice components that define first and second grooves for receiving the bare glass portions of mating optical fibers, as well as the coated or buffered portion of at least one of the optical fibers when the splice components are biased together by an actuator. The mating optical fibers are aligned while the coated or buffered portion of one of the optical fibers is retained within the same connector element, thus eliminating positioning problems that occur when separate connector elements are utilized for fiber alignment and strain relief. The splice components may be unbiased to allow removal of at least one of the mating optical fibers without destroying the connector assembly or potentially damaging the optical fibers.

7 Claims, 4 Drawing Sheets

U.S. PATENT DOCUMENTS

| | | | | |
|---|---|---|---|---|
| 5,394,496 | A | 2/1995 | Caldwell et al. | 385/70 |
| 6,173,097 | B1 | 1/2001 | Throckmorton et al. | 385/59 |
| 6,234,685 | B1 * | 5/2001 | Carlisle et al. | 385/83 |
| 6,379,054 | B2 | 4/2002 | Throckmorton et al. | 385/66 |
| 6,439,780 | B1 | 8/2002 | Mudd et al. | 385/35 |
| 6,442,318 | B1 | 8/2002 | Goldman | 385/114 |
| 6,816,661 | B1 | 11/2004 | Barnes et al. | 385/134 |
| 6,931,193 | B2 | 8/2005 | Barnes et al. | 385/134 |
| 2001/0002220 | A1 * | 5/2001 | Throckmorton et al. | 385/66 |
| 2005/0036744 | A1 | 2/2005 | Caveney et al. | |
| 2007/0217745 | A1 * | 9/2007 | Semmler et al. | 385/53 |

OTHER PUBLICATIONS

Siecor® CAMLITE™ Connector Laser Assembly Aid Instructions, SRP-006-048, Issue 3, Sep. 1991, 6 pages.
Panduit Installation Instructions for SC OPTICAM™ Fiber Optic Connectors, 6 pages, 2005.
Panduit Specification Sheet for SC OPTICAM™ Fiber Optic Connectors, 2 pages, Aug. 2005.
NORDX/CDT Spec Sheet, FiberExpres Solutions—Optimax Field Installable Connector, 2 pages, no date.
Patent Cooperation Treaty, International Preliminary Report on Patentability for International Application No. PCT/US2007/004771, Sep. 25, 2008, 1 page.

* cited by examiner

DUAL FUNCTION SPLICE COMPONENT FOR MECHANICAL SPLICE CONNECTOR

CROSS-REFERENCE TO RELATED APPLICATION

This application is a Continuation of application Ser. No. 11/377,827 filed Mar. 16, 2006 now U.S. Pat. No. 7,264,410 by Doss and entitled "Dual Function Splice Component for Mechanical Splice Connector."

BACKGROUND OF THE INVENTION

1. Field of the Invention

The present invention relates generally to a fiber optic connector having a single connector element for providing both optical fiber alignment and strain relief, and more specifically, to a mechanical splice connector including a splice component operable for aligning and retaining the stub optical fiber and the adjoining field optical fiber, as well as strain relieving the field optical fiber.

2. Technical Background

A key objective contributing to the proper function of a fiber optic mechanical splice connector is the alignment of the mating optical fibers within the connector. Alignment is typically accomplished by applying a biasing force to a splice component to accurately align the stub optical fiber of the connector with the mating field optical fiber. Conventional mechanical splice connectors typically include a pair of opposed splice components, wherein at least one of the splice components defines a recess, channel, groove or the like, for receiving the bare glass portions of the optical fibers. The stub optical fiber and the field optical fiber are aligned and retained between the opposing splice components as the splice components are biased together by an actuator. The splice components are typically disposed within a connector housing, and generally within a ferrule holder secured to the rear of a ferrule mounted upon the stub optical fiber. A projection, such as a rib, keel or the like, extends outwardly from one of the splice components through a passageway in the ferrule holder. The actuator, for example a cam member having an internal geometry defining a cam surface, is positioned over the splice components. In an un-actuated (also referred to as "un-cammed" or "open") position, a larger internal diameter of the cam surface is located adjacent the projection with only minimal or no interference with the splice component. As the cam member is moved to the actuated (also referred to as "cammed" or "closed") position, a smaller internal diameter of the cam surface engages and exerts a radial compressive force on the projection, thus biasing the splice components together and thereby aligning and retaining the stub optical fiber and the field optical fiber between the splice components.

Once the optical fibers are aligned and retained in optical continuity, the field optical fiber must be strain relieved to the connector. Strain relief is typically accomplished by crimping a lead-in tube or an annular crimp ring about the buffered portion of the field fiber. As used herein, the terms "buffered" and "buffered optical fiber" each refer to both tight-buffered optical fiber and jacketed, or loose-tube, optical fiber cable having an outer diameter greater than about 250 microns. In contrast, the terms "un-buffered," "coated" and "coated optical fiber" each refer to the optical fiber as formed in a standard extrusion manufacturing process, including the core, the cladding and an extruded coating having an outer diameter up to and including about 250 microns. A 250 micron diameter un-buffered (hereinafter "coated") optical fiber is typically upsized to a 900 micron diameter buffered optical fiber or cable for mechanical strain relief and strength purposes. It should be noted that in some instances the coated portion of the field optical fiber may have an outer diameter up to and including about 500 microns. For purposes of simplicity and clarity, however, the outer diameter of the coated portion of the field optical fibers shown and described herein is less than or equal to about 250 microns as obtained in a typical extrusion manufacturing process. A drawback to the conventional strain relief technique for mechanical splice connectors is that once the field optical fiber is strain relieved, the splice cannot be reversed and reworked without destroying the connector assembly and potentially damaging the field optical fiber. Alternative designs for fiber optic mechanical splice connectors are known. For example, U.S. Pat. No. 6,439,780 (the '780 patent) describes a field-installable fiber optic ribbon connector and installation tool. The '780 patent describes a ribbonized portion of the fiber optic ribbon cable being inserted into a flexible portion of a splice component, but does not describe using the splice components as a mechanism to provide strain relief. Furthermore, there is no direct clamping pressure or biasing force exerted over the ribbonized portion by the splice component. U.S. Pat. No. 6,078,719 (the '719 patent) describes an optical fiber holder that clamps and retains both the bare glass portion and the buffered portion of the field optical fiber, but does not align the optical fibers for mechanical splicing. A significant drawback to these other mechanical splice connectors is that optical fiber alignment and strain relief must be performed in more than one step and using more than one element of the connector, thus requiring additional materials, as well as additional time and labor cost to install the connector. A further drawback to these conventional mechanical splice connectors is that once the optical fibers are strain relieved by applying a crimp, the splice cannot be reversed without destroying the connector assembly or potentially damaging the field optical fiber.

Accordingly, what is desired in a fiber optic mechanical splice connector is a single connector element that performs both the function of optical fiber alignment for splicing the stub optical fiber and the field optical fiber, and the function of strain relieving the field optical fiber to the connector. In contrast to conventional fiber optic connectors that include separate connector elements for optical fiber alignment and strain relief, it would be desirable to provide a fiber optic connector having a single connector element that performs both functions in order to save materials, as well as time and labor cost in connector installation. Further, it would be desirable to provide a single connector element for optical fiber alignment and field fiber strain relief that is completely reversible without destroying the connector assembly or potentially damaging the field optical fiber. It would also be desirable to provide a cam assembly, that when rotated or moved to an actuated position, biases the splice components of the connector together, thus closing the splice components around the bare glass portions of the optical fibers and a coated portion, or alternatively, a buffered portion of at least one of the optical fibers.

SUMMARY OF THE INVENTION

In one aspect, the present invention is directed to a fiber optic mechanical splice connector having a dual function connector element operable for providing both optical fiber alignment and field fiber strain relief. While traditional fiber optic connectors utilize one element of the connector to align the optical fibers for splicing and a separate element of the connector for strain relieving the buffered portion of the field optical fiber, a single element of the present invention performs both functions. The use of a single element of the connector for both functions eliminates positioning effects caused by the two separate elements moving independently of each other during environmental changes, as well as in normal operation.

In another aspect, the present invention is directed to a fiber optic connector including a splice component for providing both splice alignment and field fiber strain relief. The connector may be of any conventional connector type that requires the splicing of two or more adjoining optical fibers along with the strain relief of the coated portion, or alternatively, the buffered portion of the field optical fiber. An exemplary connector described herein is a field-installable fiber optic connector from the UniCam® family of mechanical splice connectors available from Corning Cable Systems of Hickory, N.C. The UniCam® family of splice connector includes both single fiber and multi-fiber pre-stubbed fiber optic connectors. The present invention is equally applicable to both single fiber and multi-fiber mechanical splice connectors, and therefore, will only be described in detail herein with regard to single fiber connectors. The mechanical splice connector includes first and second, also referred to herein as "upper" and "lower," opposed splice components that extend longitudinally within the connector. At least one of the splice components includes a first portion defining an alignment groove, while the other splice component defines an opposing flat surface. The bare glass portions of the adjoining stub optical fiber and the field optical fiber are received and aligned within the alignment groove. The alignment groove and the opposing flat surface together provide three points of contact on the stub optical fiber and the field optical fiber, which is considered to be the optimal method to align cylindrical objects, such as the bare glass portions of the optical fibers. The splice components thereby provide axial alignment of the stub optical fiber to the field optical fiber.

In the present invention, the splice components further include second portions defining opposing retention grooves for retaining and compressing the coated portion, or alternatively, the buffered portion of the field optical fiber therebetween. Thus, the splice components together define at least a first groove for aligning the bare glass portions of the optical fibers and a pair of second grooves for retaining the coated portion or the buffered portion of the field optical fiber. As shown herein, the upper splice component defines only one retention groove that is sized to oppose the retention groove of the lower splice component when the cam assembly is actuated. The bare glass fiber region of the upper splice component remains flat to maintain the optimal three points of contact for fiber alignment. As a result, precise lateral alignment of the opposing splice components is not required. The alignment groove that aligns the smaller diameter bare glass portions of the optical fibers is smaller than the retention grooves that retain the larger diameter coated portion or buffered portion of the field optical fiber. The smaller alignment groove is sized to receive and align the bare (i.e., stripped) stub optical fiber and field optical fiber for mechanical splicing, while the larger retention grooves are intended to receive and retain the coated portion or the buffered portion of the field optical fiber, thereby strain relieving the field optical fiber to the connector. In an exemplary embodiment, the alignment groove for aligning the adjoining optical fibers is operable for receiving and seating a 125-127 micron bare optical fiber, while the retention grooves that retain the coated portion or the buffered portion of the field optical fiber are operable for accommodating a coated optical fiber having a diameter up to and including about 250 microns, or alternatively, a buffered optical fiber having a diameter greater than about 250 microns up to about 900 microns. In other embodiments, the alignment groove and the retention grooves may be sized and shaped to accommodate bare glass optical fibers, coated or buffered optical fibers having any desired diameter, for example between about 125 and about 900 microns or more. The splice components may further define a transition region between the larger retention grooves and the smaller alignment groove operable for guiding the bare glass fiber portion of the field optical fiber into the smaller alignment groove. The transition region is preferably funnel-shaped and a similar transition region may be provided at each end of one or both retention grooves. The larger retention grooves and the transition regions serve to guide the bare glass portions of the stub optical fiber and the field optical fiber into the smaller alignment groove.

In yet another aspect, the first groove and the second groove are each preferably positioned on the surface of the splice component opposite a projection, such as a rib, keel or the like. The use of separate projections is also possible, as well as the use of separate projections having different geometries and sizes corresponding to the different sized grooves to compensate for the different forces required for the mechanical splicing of bare optical fibers and the retention of the field optical fiber. Prior to insertion into the connector, the end of the field optical fiber is stripped and cleaved to a specified length. This leaves a section of bare glass fiber protruding from the coated portion, or the coated and buffered portion, of the field optical fiber. The field optical fiber is inserted into the open rear end of the connector opposite the ferrule and is guided between the splice components. The bare glass portion of the field optical fiber enters the splice components through the larger retention grooves. The bare glass portion of the field optical fiber continues through the retention grooves and the transition zone into the smaller alignment groove. Once in the alignment groove, the bare glass portion of the field optical fiber is advanced until it comes into physical contact with the end of the stub optical fiber that is disposed within and extends rearwardly from the ferrule. When the ends of the two fibers make contact, a sufficient length of the coated or buffered portion of the field optical fiber is disposed within the retention grooves. The connector further includes a cam member movable between an initial, un-actuated position allowing the splice components to remain apart to facilitate insertion of the field optical fiber, and a final, actuated position in which the cam member biases the splice components towards one another to align the stub optical fiber and the field optical fiber therebetween. In a particular embodiment, the cam member is rotated while the end of the field optical fiber is in physical contact with the end of the stub optical fiber. Rotation of the cam member causes an interior cam surface, having a predetermined geometry, to come into contact with the projections on the splice components, and thereby bias the splice components around the bare glass portions of the optical fibers and the coated or buffered portion of the field optical fiber, thus providing both alignment and strain relief. Upon cam actuation, the alignment region and the retention region are constrained within the same element of the connector, and specifically the splice components, which eliminates positioning problems that occur when separate elements of the connector are utilized for the mechanical splicing and strain relief functions. The field optical fiber may be removed from the connector after it has been initially terminated to the connector by returning the cam to the initial, un-actuated position, thereby releasing the clamping forces on both the bare glass portion and the coated or buffered portion of the field optical fiber.

Additional features and advantages of the invention will be set forth in the detailed description which follows, and in part will be readily apparent to those skilled in the art from that description or recognized by practicing the invention as described herein, including the detailed description and claims which follow, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various preferred embodiments of the invention, and together with the detailed description, serve to explain the principles and operations thereof. Additionally, the drawings and descriptions are meant to be illustrative and not limiting.

DETAILED DESCRIPTION OF THE PREFERRED EMBODIMENTS

Figure 1:
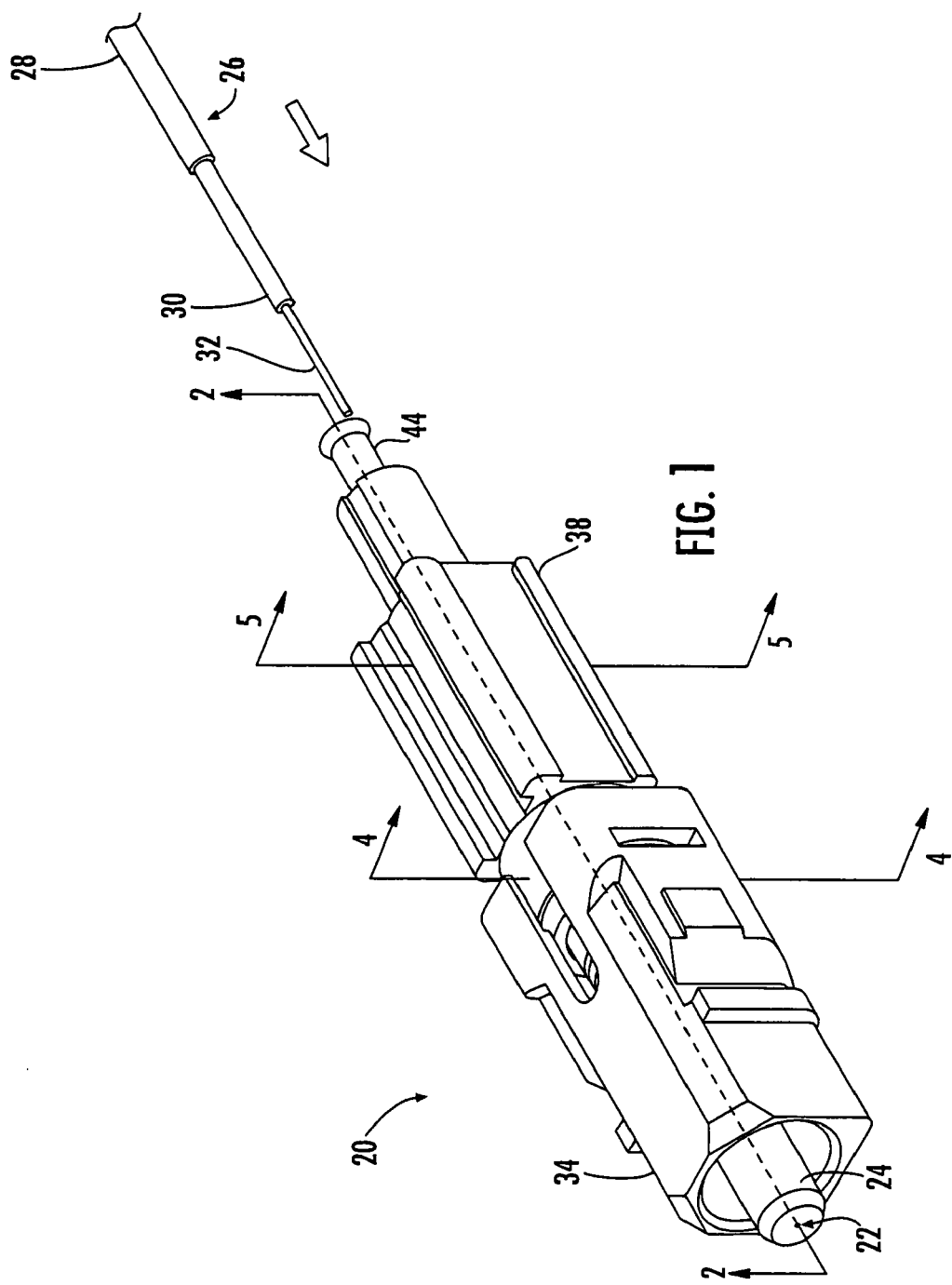
FIG. 1 is a perspective view of a fiber optic mechanical splice connector including a dual function connector element for providing optical fiber alignment and strain relief according to the present invention.

Reference will now be made in detail to presently preferred embodiments of the invention, examples of which are illustrated in the accompanying drawings. Whenever possible, the same reference numerals are used throughout the drawings to refer to the same or like parts. Although a dual function connector element operable for providing both optical fiber alignment and strain relief is shown in the accompanying drawings as one or more splice components of a particular fiber optic mechanical splice connector, it is envisioned that the dual function connector element may be any component used in any now known or hereafter devised mechanical splice connector that facilitates the splicing of two or more optical fibers, as well as the retention of one or both of the optical fibers. The broad concepts of the present invention may also be applied to any optical connection between mating optical fibers, such as a mechanical or fusion splice connection utilizing a splice component or splice device biased in any manner and having any suitable configuration.

Figure 2:
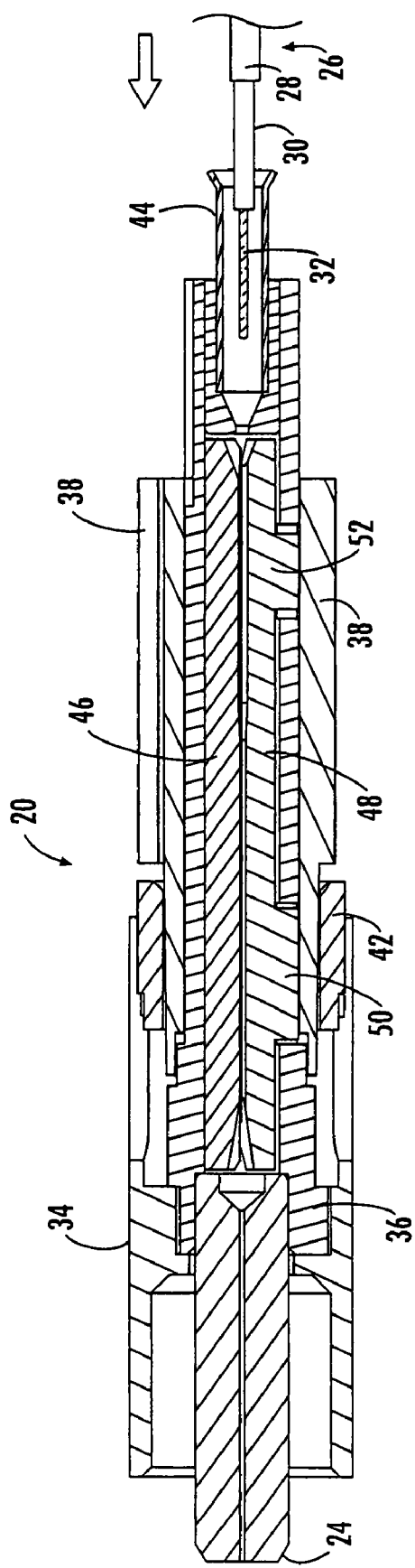
FIG. 2 is a lengthwise cross-sectional view of the mechanical splice connector of FIG. 1 taken along line 2-2.

Referring now to FIGS. 1-2, an exemplary fiber optic mechanical splice connector 20 is shown that includes a dual function connector element operable for providing both optical fiber alignment and strain relief. FIG. 1 shows a perspective view of the connector 20 and FIG. 2 shows a longitudinal cross-sectional view of the same connector 20 taken along line 2-2. The exemplary connector shown herein is a member of the UniCam® family of fiber optic mechanical splice connectors available from Corning Cable Systems of Hickory, N.C. The UniCam® family of splice connectors are pre-stubbed, thus they include a stub optical fiber 22 disposed within and affixed to a ferrule 24. The bare glass stub optical fiber 22 extends rearwardly from the ferrule 24 and is positioned between a pair of splice components 46, 48 that together comprise the dual function connector element in the preferred embodiments shown and described herein. As described in greater detail below, the splice components 46, 48 cooperate to align the stub optical fiber 22 with a mating field optical fiber 26 inserted into the rear of the connector 20. The field optical fiber 26 is prepared for insertion by removing a portion of the cable jacket 28, buffer and coating to expose a predetermined length of bare glass fiber 32. The bare glass portion 32 is preferably cleaved to a specified length. The bare glass portion 32 may transition directly to a coated portion or directly to a buffered portion of the field optical fiber 26. In either case, the coated or buffered portion 30 with the cable jacket 28 removed preferably does not extend beyond a lead-in 44 provided to guide the end of the field optical fiber 26 between the splice components 46, 48. The length of bare glass fiber 32 protruding from the coated or buffered portion 30 is inserted into the open rear end of the connector opposite the ferrule 34 and is advanced towards the splice components, as indicated by the directional arrow depicted in FIG. 1 and FIG. 2. Once guided into an alignment groove, as will be described, the end of the bare glass fiber 32 is further advanced until it comes into physical contact with the end of the stub optical fiber 22. The ends of the stub optical fiber 22 and the mating field optical fiber 26 make physical contact, and thereby establish an optical connection within the splice connector 20. The connector 20 may be sealed from the environment at the rear end by applying a flexible boot (not shown), for example having an interference fit with the cable jacket 28. The flexible boot may be affixed to the connector 20 using a crimp, collar, adhesive, interference fit or heat shrinkable material. The flexible boot may also prevent overbending of the cable adjacent the rear of the connector 20. The forward (i.e., ferrule) end of the connector 20 may be protected during deployment and installation using a protective dust cap (not shown).

The connector 20 further includes a connector housing 34 and a ferrule holder 36 disposed within the connector housing. The connector housing 34 defines a predetermined geometry configured for compatibility with conventional adapters or optical devices within an optical network. A cam member 38 is positioned over the ferrule holder 36 and defines an interior cavity having a predetermined geometry. The dual function connector element includes a first or "upper" splice component 46, and a second or "lower"; splice component 48 that each extend longitudinally within the connector 20. The upper 46 and lower 48 splice components are preferably commonly held within the ferrule holder 36. In an alternative embodiment, the splice components 46, 48 may be commonly held within an interior cavity defined by the connector 20. The lower splice component 48 preferably defines a first projection 50, such as a rib, keel or the like, and a second projection 52, such as a rib, keel or the like, spaced apart along the length of the lower splice component opposite the alignment and retention surface, as will be described. The projections 50, 52 preferably extend outwardly from the lower splice component 48 through openings or passageways formed in the ferrule holder 36. The first and second projections 50, 52 are operable for contacting the internal surface of the cam member 38 as the cam member 38 is rotated or moved from an un-actuated (also referred to as "un-cammed" or "opened") position to an actuated (also referred to as "cammed" or "closed") position in order to bias the splice components together, as will be described in greater detail below. The use of separate projections having different sizes and geometries may correspond to different sized grooves in the splice components 46, 48 and may be used to compensate for the different forces required for the mechanical splicing of the optical fibers 22, 26 and the retention of the coated or buffered portion 30 of the field optical fiber 26. The connector 20 may further include a spring retainer 42 for retaining a biasing element, such as a coil spring (not shown), that biases the ferrule 24 and the ferrule holder 36 forward relative to the connector housing 34 to ensure adequate physical contact between the stub optical fiber 22 and a mating optical fiber or optical device. The connector 20 may also further include a lead-in 44 for guiding the field optical fiber 26 into the connector.

Figure 3:
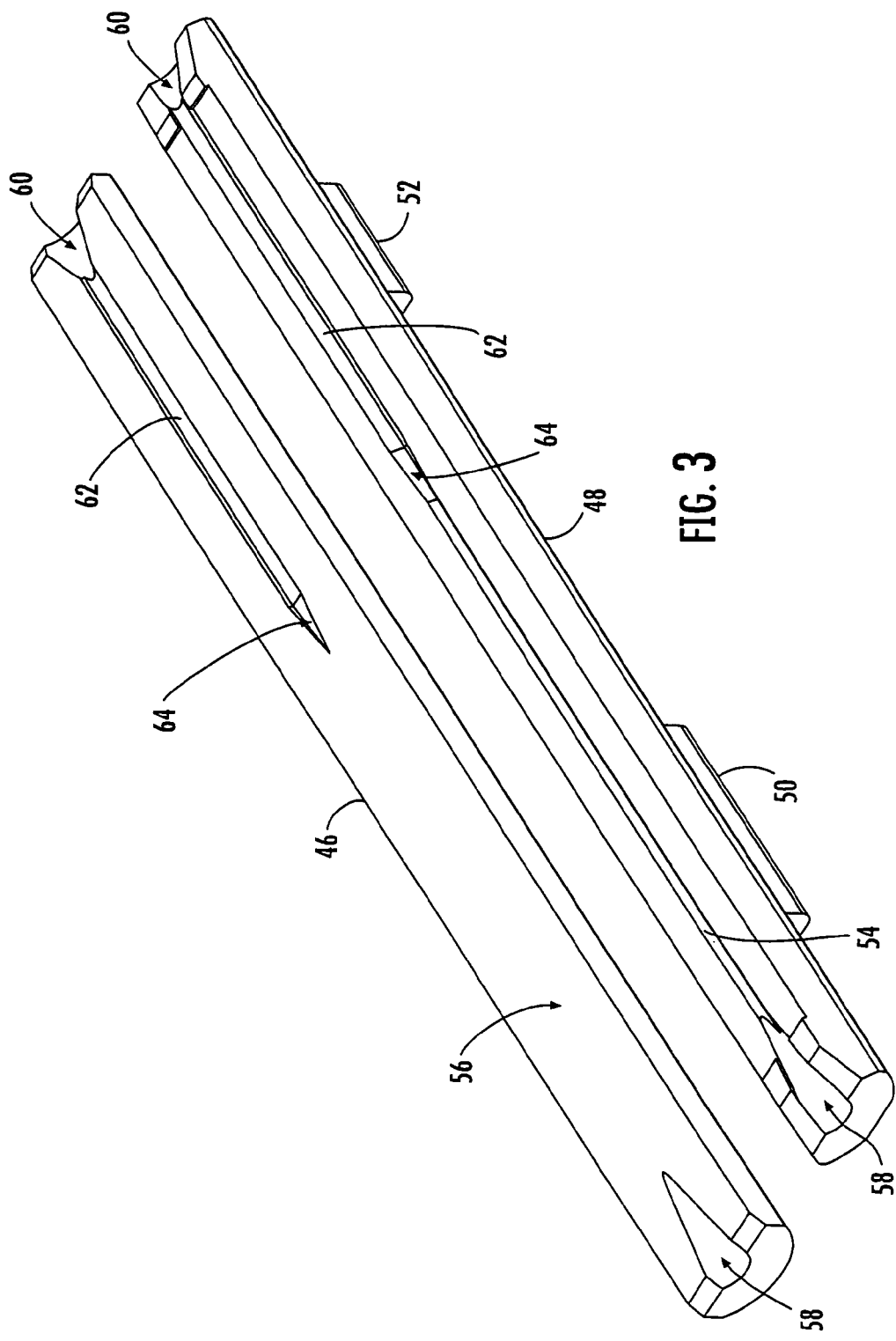
FIG. 3 is a perspective view of a pair of the cooperating dual function splice components shown side-by-side for purposes of clarity and comparison.

Referring to now FIG. 3, the dual function connector element is removed from the connector 20 and shown with the upper splice component 46 and the lower splice component 48 arranged side-by-side for purposes of clarity and comparison. The splice components 46, 48 define features for both optical fiber alignment and strain relief. For optical fiber alignment, the lower splice component 48 defines a first groove 54 positioned longitudinally along about one half of the length of the splice component. Although only one alignment groove 54 is shown, it will be apparent that a plurality of alignment grooves may be provided to accommodate a dual-fiber or multi-fiber connector having two or more stub optical fibers 22. The alignment groove 54 is also preferably positioned on the surface of the splice component 48 opposite the first projection 50. At about the same position along the length of the lower splice component 48, the upper splice component 46 defines a generally flat surface 56 that opposes the alignment groove 54 when the splice components are biased together during cam actuation. As shown and described herein, the alignment groove 54 is v-shaped, or a "v-groove." However, the alignment groove 54 may have any desired shape suitable for receiving and aligning the stub optical fiber 22 and the adjoining field optical fiber 26. The bare glass fiber region of the upper splice component 46 remains flat to maintain three points of contact for optimal fiber alignment. Accordingly, precise lateral alignment of the upper and lower splice components 46, 48 is not required. The alignment groove 54 receives and aligns the end of the bare glass stub optical fiber 22 from the ferrule 24 of the connector 20, and the end of the bare glass portion 32 of the field optical fiber 26 from the rear end of the connector 20. Based on their predetermined lengths, the optical fibers 22, 26 make physical contact at some medial position along the alignment groove 54 and are aligned and retained within the v-groove by the threes points of contact formed by the upper and lower splice components 46, 48 as they are biased together during actuation of the cam member 38. Although cam member 38 is shown and described herein, it will be readily apparent to one of ordinary skill that the connector 20 may be configured with any actuator mechanism, for example a slide, wedge or spring clip as known in the art, or any other actuator now known or hereafter devised, suitable for biasing the splice components 46, 48 together to align and retain the field optical fiber 26 relative to the stub optical fiber 22 within the connector. To aid in assembling the connector 20, funnel-shaped transitions 58 may be provided on the splice components 46, 48 at one end of the alignment groove 54 and the generally flat surface 56 in order to provide a smooth transition for the stub optical fiber 22 to be routed into the v-groove 54, thereby protecting the end face of the stub optical fiber from damage. Additional funnel-shaped transitions 60 may be provided about the other ends of the splice components 46, 48 in order to provide a smooth transition for the bare glass portion 32 of the field optical fiber 26 and to protect its end face during insertion between the splice components.

In addition to the alignment groove 54 of the lower splice component 48, the upper 46 and lower 48 splice components each further define second grooves 62. The upper 46 and lower 48 splice components define generally equally sized, and in some embodiments generally equally shaped retention grooves 62 that are aligned opposite one another when the splice components are biased together. The retention grooves 62 are positioned generally longitudinally along about one half of the length of the splice components 46, 48. Preferably, the retention grooves 62 provide multi-point contact for constraining and compressing the coated or buffered portion 30 of the field optical fiber 26 therebetween, and in particular embodiments may be larger v-grooves similar to the smaller v-shaped alignment groove 54 shown herein. The retention groove 62 of the lower splice component 48 is preferably positioned on the surface of the splice component 48 opposite the second projection 52. A medial transition 64 may be defined by one or both splice components 46, 48 to provide a smooth transition from the retention groove 62 to the flat surface 56 on the upper splice component 46, and from the retention groove 62 to the alignment groove 54 on the lower splice component 48.

Accordingly, the splice components together define a first groove 54 for aligning the bare glass portions of the stub optical fiber 22 and the field optical fiber 26, and a pair of second grooves 62 for retaining the coated or buffered portion 30 of the field optical fiber, within a single connector element (i.e., the splice components 46, 48). The alignment groove 54 that aligns the smaller diameter bare glass portions of the optical fibers 22, 26 is preferably smaller than the retention grooves 62 that retain the larger diameter coated or buffered portion 30 of the field optical fiber 26. The smaller alignment groove 54 is preferably sized to accept stripped optical fiber and to properly align the bare glass portions of the optical fibers 22, 26 for mechanical or fusion splicing. The larger retention grooves 62 are appropriately sized to provide compression on the coated or buffered portion 30 of the field optical fiber 26. In an exemplary embodiment, the alignment groove 54 for aligning the bare glass portions of the optical fibers 22, 26 is sized to receive and align bare optical fibers having a diameter of about 125-127 microns, while the retention grooves 62 that receive and strain relieve the coated or buffered portion 30 of the field optical fiber are sized to accommodate coated optical fibers having a diameter up to and including about 250 microns, or alternatively, buffered optical fibers having a diameter greater than about 250 microns and up to about 900 microns. However, it will be readily apparent to one of ordinary skill that the splice components 46, 48 and the corresponding retention grooves 62 may be sized as necessary to receive and strain relieve coated, buffered or jacketed optical fibers having any diameter, for example from about 250 microns to about 900 microns or more. While alignment groove 54 is shown and described herein as having a v-groove shape, alternatively shaped grooves, channels or recesses for accommodating one or more bare glass optical fibers, coated optical fibers or buffered optical fibers are envisioned, such as, but not limited to, cylindrical recesses and recesses that provide greater than or less than three points of contact. While the upper 46 and lower 48 splice components together define a generally cylindrical shape to cooperate with the generally cylindrical-shaped geometry of the internal surface of the cam member 38, the splice components may together define any shape suitable for cooperating with a cam member or other actuator comprising an internal surface having a predetermined geometry. In an alternative embodiment, the generally flat surface 56 of the upper splice component 46 may define a v-groove or other shaped channel that opposes the alignment groove 54 and is likewise operable for aligning the bare glass portion of the optical fibers. In addition, while the splice components 46, 48 are shown provided with grooves 54, 62 configured to accommodate only one stub optical fiber and one field optical fiber, the splice components may define additional or larger grooves configured to accommodate more than one pair of mating optical fibers, such as ribbonized optical fibers. Thus, a single connector element may be used to provide both optical fiber alignment and strain relief in a fiber optic mechanical splice connector having any ferrule type or number, and any cable type or number. Further, the individual projections 50, 52 may be replaced with a single projection having a predetermined shape configured to accommodate the different sized grooves 54, 62 formed in the splice components and the different forces required for the optical splicing and the retention functions.

Figure 4:
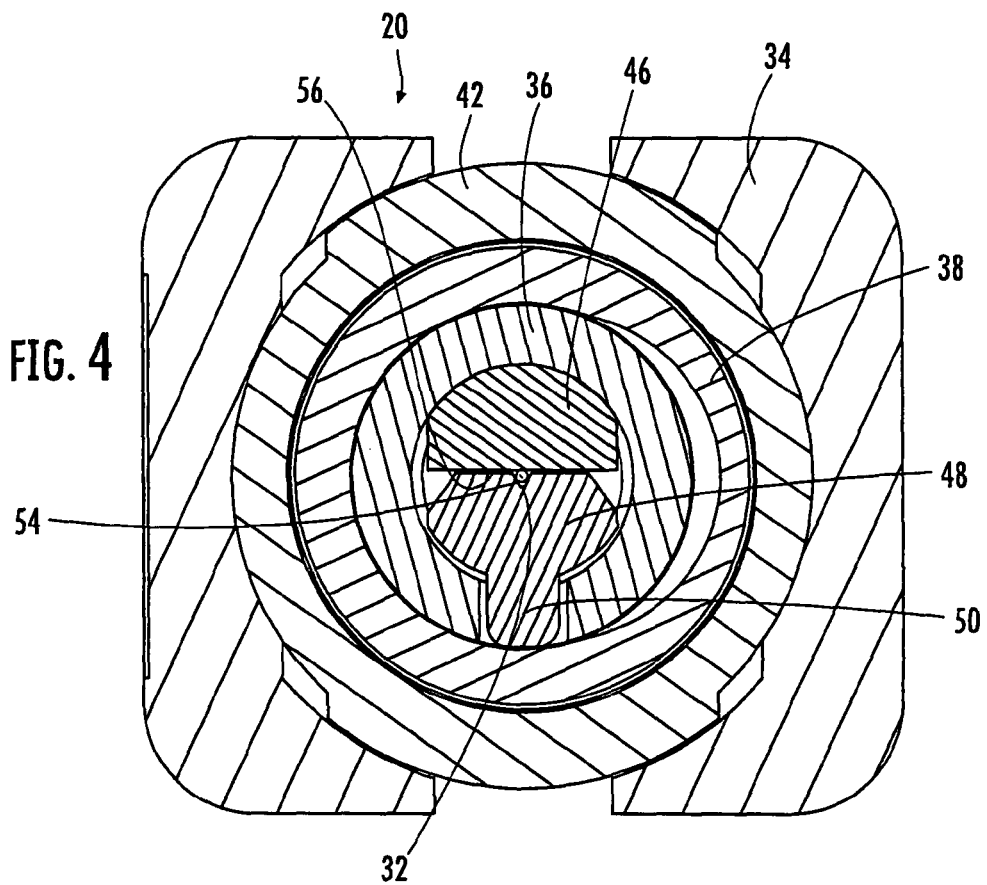
FIG. 4 is a cross-sectional view of the mechanical splice connector of FIG. 1 taken along line 4-4.

Referring now to FIG. 4, a cross-sectional view of the fiber optic mechanical splice connector 20 of FIG. 1 is shown taken along line 4-4 through the smaller alignment groove 54 of the lower splice component 48. The alignment groove 54 is preferably positioned medially on the surface of the splice component 48 opposite the first projection 50. The bare glass portion 32 of the field optical fiber 26 is shown positioned between the upper 46 and the lower 48 splice components, however, the bare glass portion of the stub optical fiber 22 is also positioned between the splice components depending upon the length of the stub optical fiber and the lengthwise location of the cross-section taken along the smaller alignment groove 54. The splice components 46, 48 are shown biased towards one another and the cam member 38 moved or rotated to the actuated position. The cam member 38 defines a predetermined internal geometry defining a cam surface and is movable (e.g., rotatable) between an initial, un-actuated position allowing the splice components 46, 48 to move apart to facilitate insertion of the optical fibers 22, 26 therebetween, and a final, actuated position in which the cam member 38 urges the splice components 46, 48 toward each other to secure at least the bare glass portion 32 of the field optical fiber 27 therebetween. With the ends of the stub optical fiber 22 and the field optical fiber 26 in physical contact with each other, the cam member 38 is actuated, and more specifically, rotated. Rotation of the cam member 38 causes the internal surface of the cam member defining a predetermined cam surface to engage and exert a radially compressive biasing force to the first projection 50 on the lower splice component 48. The biasing force exerted by the lower splice component 48 on the projection 50 causes the splice components to close around the bare glass portions of the optical fibers 22, 26, thus providing proper fiber alignment.

When the cam member 38 is positioned in the un-actuated position (not shown), a larger diameter internal geometry of the cam member 38 is preferably positioned adjacent the projection 50, thus applying minimal or no interference with the projection 50. As the cam member 38 is rotated into the actuated position shown in FIG. 4, the diameter of the internal surface of the cam member 38 decreases and the cam surface defined by the cam member engages and applies a biasing force to the projection 50, thus urging the splice components 46, 48 together and thereby aligning and retaining the mating optical fibers 22, 26 therebetween. The cam member 38 may be rotated by hand, but is preferably rotated using a tool. A suitable tool may include features for holding the connector in place while a lever, gear or cam wrench is used to rotate the cam.

The cam member 38 in FIG. 4 is shown rotated about 90 degrees in the counterclockwise direction from its initial un-actuated position in FIG. 2. In an exemplary embodiment, when the cam member 38 is in the un-actuated position, the cam member defines three internal diameters: a first diameter that is aligned with but does not interfere with the projection 50; a second intermediate diameter that is smaller than the first diameter; and a third diameter that is smaller than the second intermediate diameter. There may be a gradual decrease in the diameter of the interior of the cam member 38 from the first to the third diameters. The third diameter is in contact with the projection 50 when the cam member 38 is rotated to the actuated position. The cam member 38 may maintain the internal dimensional relationships where the first diameter is greater than the second diameter, and the second diameter is greater than the third diameter when the cam member 38 is moved into the actuated position. In an alternative embodiment, the cam member 38 may distort when rotated to the actuated position, thus changing the internal dimensional relationships. For example, in the actuated position, the internal surface of the cam member 38 may flex where the cam member 38 is in line with the projection 50, thus resulting in a lengthening of the cam member along one axis (e.g., y-axis) and a shortening of the cam member along another axis (e.g., x-axis), all the while either maintaining or changing the relationships between the three diameters. Thus, the flexing of the cam member 38 may result in an elongation in one direction as the cam member is rotated between the un-actuated and actuated positions. Maintaining the cam member 38 in the actuated position may be achieved by both the interference of the cam member 38 with the projection 50, along with the flexing of the cam member, which creates a spring force or stored energy, helping to hold the connector assembly in the actuated position, and accommodating any differences in expansion or contraction of the assembly materials while undergoing temperature changes.

Figure 5:
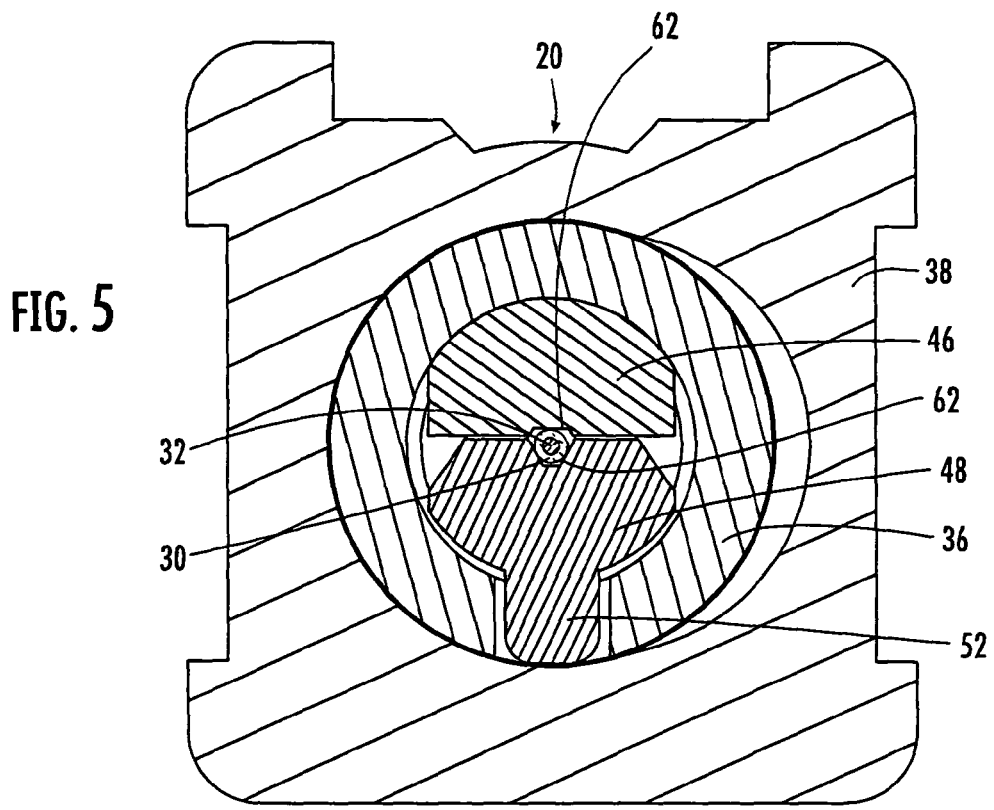
FIG. 5 is a cross-sectional view of the mechanical splice connector of FIG. 1 taken along line 5-5.

Referring now to FIG. 5, a cross-sectional view of the connector of FIG. 1 is shown taken along line 5-5 through the larger retention grooves 62 of the splice components 46, 48. One of the retention grooves 62 is preferably positioned on the surface of the lower splice component 48 opposite the second projection 52. The coated or buffered portion 30 of the field optical fiber 26 is shown retained between the upper 46 and lower 48 splice components. The splice components 46, 48 are shown biased towards one another and the cam member 38 actuated, and more specifically, rotated to the actuated position. Rotation of the cam member 38 causes the cam surface defined by the internal geometry of the cam member to engage the second projection 52 on the lower splice component 48, and thereby cause the splice components to close around the coated or buffered portion of the field optical fiber 26, thus providing suitable strain relief.

In preferred embodiments, the projections 50, 52 are positioned along the lower splice component 48 such that they alternately contact the cam surface defined by the internal geometry of the cam member 38 as the cam member is actuated. In one embodiment, the cam member 38 may define a uniform internal geometry along its length and the first projection 50 and the second projection 52 may be sized differently to produce different biasing forces. For example, the second projection 52 may be larger than the first projection 50, such that when contacting the cam surface defined by the internal geometry of the cam member 38, a larger biasing force is applied to the second projection 52 by the cam member 38, thereby applying a greater amount of force to the retention portion of the splice components as compared to the fiber alignment portion. In another exemplary embodiment, the projections 50, 52 may be equally sized to apply an equal amount of biasing force along the length of the splice components. In yet another exemplary embodiment, the first projection 50 may be larger than the second projection 52 in order to apply a greater amount of force to the fiber alignment portion of the splice components. In further variations, the first and second projections 50, 52 may be generally equally sized while the predetermined geometry of the internal cavity of the cam member 38 varies along its length, thus compensating for the different forces required for the mechanical splicing of the optical fibers 22, 26 and the retention of the coated or buffered portion 30 of the field optical fiber 26.

In one embodiment, the first and second projections 50, 52 are sized and positioned such that they simultaneously contact the cam surface defined by the internal geometry of the cam member 38 as the cam member is actuated, thus providing a one-step process for both fiber alignment and strain relief. In an alternative embodiment, however, the projections 50, 52 may be sized and positioned such that they contact the cam surfaces defined by the internal geometry of the cam member 38 in two separate steps. Thus, the cam member 38 may be moved (i.e., rotated) to a first position for fiber alignment, and subsequently moved (i.e., rotated) to a second position for strain relief, while still providing both fiber alignment and retention with the single splice element. In this manner, the field optical fiber 26 may be removed and/or repositioned within the connector 20 in the event that the optical continuity between the stub optical fiber 22 and the field optical fiber 26 is unacceptable before the coated or buffered portion 30 of the field optical fiber is strain relieved to the connector.

While conventional mechanical splice connectors utilize separate components for fiber alignment and strain relief, such as the splice components for alignment and crimp elements for strain relief, the strain relief is typically not reversible without destroying the connector assembly or potentially damaging the field optical fiber. In contrast to conventional mechanical splice connectors, the dual function connector element of the present invention is fully reversible in that the field optical fiber 26 may be removed from the connector 20 after it has been partially terminated by returning the cam member 38 to the original, un-actuated position, thus releasing the clamping forces on both the bare glass portion 32 and the coated or buffered portion 30 of the field optical fiber 26. The cam member 38 may be reversed by rotating it by hand, but is preferably rotated using a tool.

In other embodiments, the connector elements may be modified to accommodate specific applications in order to accommodate different connector types, fibers and cable sizes. External features of the cam member 38 may be configured to provide a gripping surface for applying a force from the tool. The material chosen for the cam member 38 is preferably resilient and flexible enough to provide a spring force to assist in holding the assembly in the actuated position, while allowing the cam member to return to its original shape in the un-actuated position. In alternative embodiments, the cam member 38 may be rigid, thereby relying on an interference fit to hold the splice components 46, 48 in the actuated position.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A fiber optic splice connector, comprising:
   a ferrule having at least one stub optical fiber mounted therein;
   a pair of opposed splice components defining at least one feature for receiving a bare glass portion of the at least one stub fiber, and a bare glass and a coated portion of at least one field fiber; and
   a cam positioned about the pair of splice components such that rotation of the cam about the pair of splice components causes the pair of splice components to move together to align and strain relieve the at least one stub fiber with the at least one field fiber.

2. The connector according to claim 1 wherein the at least one feature comprises a first groove for receiving and aligning the bare glass portion of the at least one stub fiber and the bare glass portion of the at least one field optical fiber and a second groove for receiving the coated portion of the at least one field fiber.

3. The connector according to claim 2 wherein the first groove is sized smaller than the second groove.

4. The connector according to claim 1 wherein one splice component of the pair of splice components defines at least one keel.

5. A fiber optic splice connector comprising:
   a first splice component defining a first groove for receiving bare glass portions of a stub fiber and a field fiber, and a second groove for receiving a coated portion of the field fiber;
   a second splice component positioned opposite the first splice component;
   one or more keels defined by at least one of the first and the second splice components; and
   a cam movable between an un-actuated position in which the cam does not interfere with the one or more keels and an actuated position in which the cam does interfere with the one or more keels to urge the first and the second splice components together.

6. The splice connector according to claim 5 wherein actuation of the cam simultaneously aligns the bare glass portions of the stub fiber and the field fiber, and strain relieves the field fiber.

7. A method of providing both optical fiber alignment and retention in an optical splice between mating optical fibers, the method comprising:
   providing a first optical fiber including a bare glass portion;
   providing a second optical fiber including a bare glass portion and a coated or buffered portion having a diameter greater than the diameter of the bare glass portion;
   disposing the first optical fiber and the second optical fiber between a pair of opposed splice components, at least one of the splice components having a first groove sized to receive and align the bare glass portion of the first optical fiber and the adjoining bare glass portion of the second optical fiber, at least one of the splice components having a second groove sized to receive and retain the coated or buffered portion of the second optical fiber;
   biasing the splice components together such that the bare glass portions of the first and second optical fibers are aligned within the first groove and the coated or buffered portion of the second optical fiber is retained within the second groove.

* * * * *